US010438405B2

(12) United States Patent
Ni et al.

(10) Patent No.: US 10,438,405 B2
(45) Date of Patent: Oct. 8, 2019

(54) DETECTION OF PLANAR SURFACES FOR USE IN SCENE MODELING OF A CAPTURED SCENE

(71) Applicant: SONY CORPORATION, Tokyo (JP)

(72) Inventors: Jie Ni, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 97 days.

(21) Appl. No.: 15/447,272

(22) Filed: Mar. 2, 2017

(65) Prior Publication Data

US 2018/0253858 A1    Sep. 6, 2018

(51) Int. Cl.
| | | |
|---|---|---|
| *G06T 17/00* | (2006.01) | |
| *G06T 7/73* | (2017.01) | |
| *G06T 7/11* | (2017.01) | |
| *G06K 9/00* | (2006.01) | |

(52) U.S. Cl.
CPC ............ *G06T 17/00* (2013.01); *G06T 7/75* (2017.01); *G06K 9/00201* (2013.01); *G06T 7/11* (2017.01); *G06T 2200/04* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 9,098,754 B1 * | 8/2015 | Stout .................. | G06K 9/00805 |
| 9,118,905 B2 | 8/2015 | Gallup et al. | |
| 2010/0034422 A1 * | 2/2010 | James ..................... | G06T 7/246 |
| | | | 382/103 |
| 2010/0315412 A1 * | 12/2010 | Sinha ..................... | G06T 15/00 |
| | | | 345/419 |
| 2013/0011069 A1 * | 1/2013 | Quan ..................... | G06F 16/583 |
| | | | 382/190 |
| 2015/0286893 A1 | 10/2015 | Straub et al. | |
| 2016/0203387 A1 * | 7/2016 | Lee .......................... | G06T 7/73 |
| | | | 348/44 |
| 2017/0132307 A1 * | 5/2017 | Xiao ..................... | G06F 16/285 |

FOREIGN PATENT DOCUMENTS

| | | |
|---|---|---|
| CN | 103914875 A | 7/2014 |
| WO | 2014146668 A2 | 9/2014 |

* cited by examiner

*Primary Examiner* — Justin P. Misleh
(74) *Attorney, Agent, or Firm* — Chip Law Group

(57) ABSTRACT

An image-processing method and system are provided for detection of planar surfaces for use in scene modeling of a captured scene, which includes determination of three dimensional (3D) coordinates that corresponds to a plurality of scene points of the captured scene. The 3D coordinates are determined based on depth information associated with the plurality of scene points. A plurality of vectors are computed for the plurality of scene points, based on the determined 3D coordinates. The computed plurality of vectors associated with the captured scene are clustered into a first set of clusters based on orientation information associated with each of the computed plurality of vectors. Further, for each cluster of the first set of clusters, a second set of clusters, are determined based on distance information associated with the computed plurality of vectors, followed by detection of a plurality of planar surfaces in the captured scene.

20 Claims, 5 Drawing Sheets

DETECTION OF PLANAR SURFACES FOR USE IN SCENE MODELING OF A CAPTURED SCENE

CROSS-REFERENCE TO RELATED APPLICATIONS/INCORPORATION BY REFERENCE

None.

FIELD

Various embodiments of the disclosure relate to image-processing technologies for scene modeling. More specifically, various embodiments of the disclosure relate to an image-processing method and system for detection of planar surfaces for use in scene modeling of a captured scene.

BACKGROUND 3D models, such as 3D computer graphics models, are increasingly used in games and entertainment systems, training simulations, to create digital models of virtual museums, libraries, buildings and structures, to map terrain, and to create animated and non-animated objects. Increased demand for 3D content, particularly more complex and realistic 3D models, has led to rapid evolution of systems that create 3D models from real scenes, including models of objects placed in real scenes.

Various techniques have been developed to gather texture and depth information at various scene points by processing data contained in video frames of a scene to create a 3D model of the scene. As an image frame is a two-dimensional (2D) representation of a 3D scene, a point in the image frame does not uniquely determine the location of a corresponding point in a scene. Additional information is required to reconstruct a 3D scene from 2D information. A known technique uses stereoscopic imaging equipment having two cameras to capture a stereo video of a scene. Prior to capturing the stereo video, the cameras are calibrated so that their video can be registered in a common coordinate system. The cameras differ only in the location of their optical centers, which is a function of system design and is therefore known. By triangulating the distance between the location of the camera's optical centers and information about points in frames corresponding to landmark scene points, depth information about the landmark points can be deduced.

In certain conventional techniques for mapping 3D surfaces, a polygon mesh may be generated that approximates the 3D surface of the scene. In this technique, each of the points in frames generates a vertex of a polygon and defines a boundary of the polygon. A 3D "mesh model" is constructed by combining the polygon shapes in a manner that may be considered analogous to piecing together a puzzle where each piece of the puzzle is a polygon shape. The realism and quality of a 3D model obtained by this method depends on the use of two cameras, availability of landmark scene points, and/or different methods of identification of landmark scene points in the images. Essentially, the different methods of identification must process all the pixel data from each frame to identify landmark scene points. Thus, such methods are computationally intensive to implement and require certain pre-conditions, such as availability of landmark scene points, or the like, which may not be desirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing method and system are provided for detection of planar surfaces for scene modeling of a captured scene substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Figure 1:
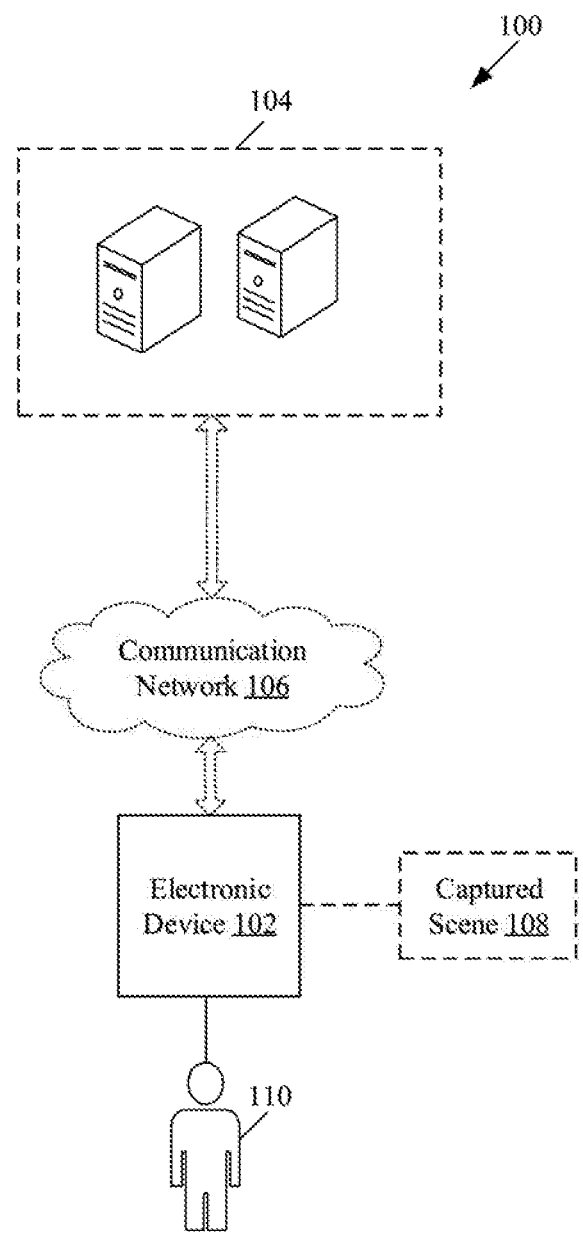
FIG. 1 is a block diagram that illustrates an exemplary network environment for detection of planar surfaces in a scene, in accordance with an embodiment of the disclosure.

The following described implementations may be found in the disclosed image-processing method and system for scene modeling. Exemplary aspects of the disclosure may include image-processing implemented in an electronic device that may include one or more circuits. The image-processing may include determination of three dimensional (3D) coordinates corresponding to a plurality of scene points of a scene captured by the one or more circuits, based on depth information associated with the plurality of scene points. The image-processing may further compute a plurality of vectors for the plurality of scene points respectively, based on the determined 3D coordinates. The image-processing may further cluster the computed plurality of vectors into a first set of clusters associated with the captured scene based on orientation information associated with each of the computed plurality of vectors. The image-processing may further determine, for each cluster of the first set of clusters, a second set of clusters, based on distance information associated with the computed plurality of vectors and may further detect a plurality of planar surfaces in the captured scene based on the determined second set of clusters. In accordance with various embodiments, the one or more circuits may correspond to an imaging device and the captured scene may correspond to an indoor scene comprising the plurality of scene points. In accordance with an embodiment, the depth information associated with the plurality of scene points is obtained using one or more sensors.

In accordance with an embodiment, the image-processing may further comprise determination of a pair of orthogonal vectors based on the determined 3D coordinates of two neighboring scene points from the plurality of scene points. In accordance with an embodiment, the image-processing may further utilize each of the pair of orthogonal vectors for the computation of the plurality of vectors for the plurality of scene points. In accordance with an embodiment, the determined pair of orthogonal vectors include a horizontal tangent vector and a vertical tangent vector. In accordance with an embodiment, the image-processing further comprises plotting of the computed plurality of vectors on a unit sphere to analyze a distribution of the computed plurality of vectors in the first set of clusters. In accordance with an embodiment, the image-processing may further comprise determining an overall 3D structure of the captured scene using the plurality of planar surfaces, where each of the plurality of planar surfaces are detected separately in the captured scene.

In accordance with an embodiment, each of the computed plurality of vectors may correspond to a surface normal that is computed for each scene point of the plurality of scene points for the captured scene. In accordance with an embodiment, the clustering of the computed plurality of vectors into the first set of clusters is performed in an orientation space, and the determination of the second set of clusters is performed in a distance space.

In accordance with an embodiment, the determination of each cluster in the second set of clusters may be based on a specified threshold value. The specified threshold value may correspond to a minimum number of scene points required to form a cluster in the second set of clusters. In accordance with an embodiment, the first set of clusters may correspond to one or more planar surfaces parallel to one or more visible surfaces in the captured scene.

FIG. 1 is a block diagram that illustrates an exemplary network environment for detection of planar surfaces in a scene, in accordance with an embodiment of the disclosure. With reference to FIG. 1, there is shown an exemplary network environment 100. The network environment 100 may include an electronic device 102, one or more cloud resources, such as a server 104, and a communication network 106. There is further shown a captured scene 108 and one or more users, such as a user 110. With reference to FIG. 1, the electronic device 102 may be communicatively coupled to the server 104, via the communication network 106. The user 110 may be associated with the electronic device 102. The captured scene 108 may correspond to an image frame that may be captured and/or processed by the electronic device 102.

The electronic device 102 may comprise suitable logic, circuitry, interfaces, and/or code that may be configured to communicate with the server 104, via the communication network 106. The electronic device 102 may include circuitry that may be configured to detect planar surfaces in a scene, such as the captured scene 108. Examples of the electronic device 102 may include, but are not limited to, an imaging device (such as a camera or a camcorder), an image- or video-processing device, a motion-capture system, a projector device, or a computing device.

The server 104 may comprise suitable logic, circuits, interfaces and/or code that may be configured to communicate with the electronic device 102, via the communication network 106. The server 104 may further include circuitry that may be configured to detect planar surfaces in a scene, such as the captured scene 108. Examples of the server 104 may include, but are not limited to a web server, a database server, a file server, an application server, or a combination thereof. The server 104 may be implemented by use of several technologies that are well known to those skilled in the art.

The communication network 106 may include a medium through which the electronic device 102 and the server 104, may communicate with each other. The communication network 106 may be a wired or wireless communication network. Examples of the communication network 106 may include, but are not limited to, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The captured scene 108 may refer an image frame of a sequence of image frames. The captured scene 108 may correspond to an indoor scene or an outdoor scene captured by the electronic device 102 and includes various planar surfaces that are to be detected. Examples of the planar surfaces may include, but are not limited to, one or more walls, a floor, a ceiling, and other furniture or object surfaces, for example, a table top, a white board and the like. Examples of the captured scene 108 may include, but are not limited to, a pre-recorded image frame, a video scene, or an audio-visual digital content captured in real time, near-real time, or a lag time.

In accordance with an embodiment, the captured scene 108 may be processed by the electronic device 102 for detection of the planar surfaces. In accordance with another embodiment, the captured scene 108 may be processed by the server 104. In such a case, the electronic device 102 may transmit the captured scene 108 to the server 104, via the communication network 106. The server 104 may then process the captured scene 108 and communicate the detected planar surfaces to the electronic device 102, via the communication network 106.

In operation, the electronic device 102 may include an imaging device (not shown) that may be configured to capture a scene, such as the captured scene 108. In certain scenarios, the captured scene 108 may correspond to a pre-stored image, which may be retrieved from a local memory (not shown) of the electronic device 102. In accordance with an embodiment, the captured scene 108 may correspond to an indoor scene that may comprise a plurality of scene points.

The electronic device 102 may include one or more sensors, such as a motion sensor or a depth sensor, that may be configured to provide depth information associated with the plurality of scene points in the captured scene 108. Based on the depth information obtained from the one or more sensors, the electronic device 102 may be configured to determine three dimensional (3D) coordinates corresponding to the plurality of scene points of the captured scene 108.

Based on the determined 3D coordinates, the electronic device 102 may be further configured to compute a plurality of vectors for the plurality of scene points respectively. The electronic device 102 may be configured to determine a pair of orthogonal vectors based on the determined 3D coordinates of two neighboring scene points of the plurality of scene points. The electronic device 102 may be further configured to utilize each of the determined pair of orthogonal vectors for the computation of the plurality of vectors for the plurality of scene points. Each of the computed plurality of vectors may correspond to a surface normal that is computed for each scene point of the plurality of scene points for the captured scene.

The electronic device 102 may be configured to cluster the computed plurality of vectors into a first set of clusters associated with the captured scene based on orientation information associated with each of the computed plurality of vectors. The clustering of the computed plurality of vectors into the first set of clusters may be performed in an orientation space. The first set of clusters may correspond to one or more planar surfaces parallel to one or more visible surfaces in the captured scene. The computed plurality of vectors may be plotted on a unit sphere to analyze a distribution of the computed plurality of vectors in the first set of clusters.

The electronic device 102 may be further configured to determine, for each cluster of the first set of clusters, a second set of clusters, based on distance information associated with the computed plurality of vectors. The determination of the second set of clusters may be performed in a distance space. The determination of each cluster in the second set of clusters may be based on a specified threshold value. The specified threshold value may correspond to a minimum number of scene points required to form a cluster in the second set of clusters. The electronic device 102 may detect the plurality of planar surfaces in the captured scene 108 based on the determined second set of clusters. Each of the plurality of planar surfaces may be detected as an individual separate surface in the captured scene 108. Once the plurality of planar surfaces in the captured scene 108 are detected, the electronic device 102 may be configured to determine (or deduce) an overall 3D structure of the captured scene 108 using the plurality of planar surfaces.

In accordance with another aspect of the disclosure, the electronic device 102 may be configured to transmit the captured scene that includes the plurality of planar surfaces to the server 104, via the communication network 106. The server 104 may be configured to determine the 3D coordinates corresponding to the plurality of scene points of the captured scene 108, based on the depth information associated with the plurality of scene points. The server 104 may be configured to compute the plurality of vectors for the plurality of scene points respectively, based on the determined 3D coordinates. The server 104 may be further configured to cluster the computed plurality of vectors into a first set of clusters associated with the captured scene based on the orientation information associated with each of the computed plurality of vectors. The server 104 may be further configured to determine, for each cluster of the determined first set of clusters, the second set of clusters, based on the distance information associated with the computed plurality of vectors. The server 104 may be further configured to detect the plurality of planar surfaces in the captured scene based on the determined second set of clusters and transmit the detected planar surfaces in the captured scene 108 to the electronic device 102, via the communication network 106.

Figure 2:
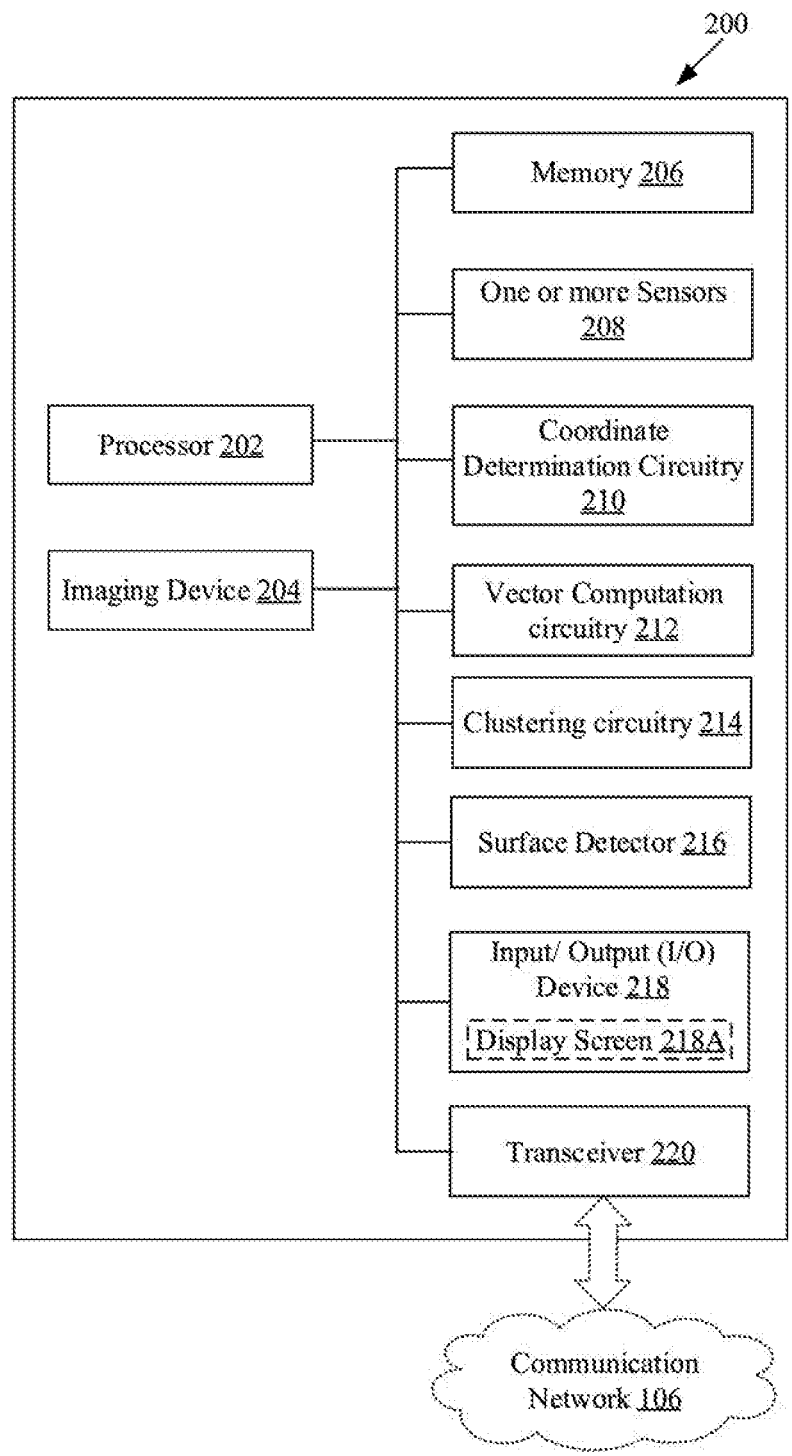
FIG. 2 is a block diagram of an image-processing system, in accordance with an embodiment of the disclosure.

FIG. 2 is a block diagram of an image-processing system, in accordance with an embodiment of the disclosure. FIG. 2 is described in conjunction with FIG. 1. With reference to FIG. 2, there is shown a block diagram 200 of the electronic device 102 that may include a plurality of circuits configured to detect planar surfaces in a scene. The plurality of circuits may include a processor 202, an imaging device 204, a memory 206, one or more sensors 208, a coordinate determination circuitry 210, a vector computation circuitry 212, a clustering circuitry 214, a surface detector 216, one or more input/output (I/O) devices, such as an I/O device 218, and a transceiver 220. Further, the I/O device 218 may comprise a display screen 218A. There is further shown the communication network 106 of FIG. 1.

With reference to FIG. 2, the plurality of circuits, such as the processor 202, the imaging device 204, the memory 206, the one or more sensors 208, the coordinate determination circuitry 210, the vector computation circuitry 212, the clustering circuitry 214, the surface detector 216, the I/O device 218, and the transceiver 220 may be communicatively coupled with each other. The output of the one or more sensors 208 may be provided to the coordinate determination circuitry 210 in conjunction with the processor 202. The output of the coordinate determination circuitry 210 may be provided to the vector computation circuitry 212 in conjunction with the processor 202. Further, the output of the vector computation circuitry 212 may be provided to the clustering circuitry 214 in conjunction with the processor 202. The output of the clustering circuitry 214 may be provided to the surface detector 216 in conjunction with the processor 202. Further, the output of the surface detector 216 may be provided to the I/O device 218. The transceiver 220 may be configured to communicate with a server, such as the server 104 (FIG. 1), via the communication network 106. In accordance with an embodiment, the components of the block diagram 200, such as the plurality of circuits of the electronic device 102, may also be implemented in the server 104, without deviation from the scope of the disclosure.

The processor 202 may comprise suitable logic, circuitry, interfaces, and/or code that may be configured to execute a set of instructions stored in the memory 206. The processor 202 may be configured for detection of planar surfaces in a scene, such as the captured scene 108, which may be captured from the imaging device 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The imaging device 204 may comprise suitable logic, circuitry, interfaces, and/or code that may be configured to capture an indoor or outdoor scene. The captured scene, such as the captured scene 108, may include a plurality of scene points. The imaging device 204 may refer to an integrated camera or an image sensor of the electronic device 102. The imaging device 204 may comprise a viewfinder that may be configured to compose and/or focus the view of a scene captured by the imaging device 204. The imaging device 204 may be configured to store the captured scene 108 in a local buffer and/or the memory 206.

The memory 206 may comprise suitable logic, circuitry, and/or interfaces that may be configured to store a machine code and/or a set of instructions executable by the processor 202. The memory 206 may be further configured to store the captured scene 108 as an image or a video. The memory 206 may be further configured to store operating systems and associated applications of the electronic device 102. Examples of implementation of the memory 206 may include, but are not limited to, Random Access Memory (RAM), Read Only Memory (ROM), Hard Disk Drive (HDD), and/or a Flash memory.

The one or more sensors 208 may comprise suitable logic, circuitry, and/or interfaces that may be configured to provide a depth information associated with the plurality of scene points in the captured scene 108. Examples of the one or more sensors 208 may include, but are not limited to, a motion sensor, a depth sensor, an infrared (IR) sensor, an image sensor, or their combination.

The coordinate determination circuitry 210 may comprise suitable logic, circuitry, and/or interfaces that may be configured to determine three dimensional (3D) coordinates that corresponds to the plurality of scene points of the captured scene 108. The coordinate determination circuitry 210 may be implemented as a separate processor or circuitry in the electronic device 102. The coordinate determination circuitry 210 and the processor 202 may be implemented as an integrated processor or a cluster of processors that perform the functions or operations of the coordinate determination circuitry 210 and the processor 202. The coordinate determination circuitry 210 may be implemented as a set of instructions stored in the memory 206, which on execution by the processor 202 may perform the operations of the electronic device 102.

The vector computation circuitry 212 may comprise suitable logic, circuitry, and/or interfaces that may be configured to compute a plurality of vectors for the respective plurality of scene points of the captured scene 108. The vector computation circuitry 212 may be implemented as a separate processor or circuitry in the electronic device 102. The vector computation circuitry 212 and the processor 202 may be implemented as an integrated processor or a cluster of processors that perform the functions of the vector computation circuitry 212 and the processor 202. The vector computation circuitry 212 may be implemented as a set of instructions stored in the memory 206, which on execution by the processor 202 may perform the operations of the electronic device 102.

The clustering circuitry 214 may comprise suitable logic, circuitry, and/or interfaces that may be configured to compute a first set of clusters and a second set of clusters for each cluster of the first set of clusters. The clustering circuitry 214 may be implemented as a separate processor or circuitry in the electronic device 102. The clustering circuitry 214 and the processor 202 may be implemented as an integrated processor or a cluster of processors that perform the functions or operations of the clustering circuitry 214 and the processor 202. The clustering circuitry 214 may be implemented as a set of instructions stored in the memory 206, which on execution by the processor 202 may perform the operations of the electronic device 102.

The surface detector 216 may comprise suitable logic, circuitry, and/or interfaces that may be configured to detect and segregate the plurality of planar surfaces in the captured scene 108. The surface detector 216 may be implemented as a separate processor or circuitry in the electronic device 102. The surface detector 216 and the processor 202 may be implemented as an integrated processor or a cluster of processors that perform the functions or operations of the surface detector 216 and the processor 202. The surface detector 216 may be implemented as a set of instructions stored in the memory 206, which on execution by the processor 202 may perform the operations of the electronic device 102.

The I/O device 218 may comprise suitable logic, circuitry, interfaces, and/or code that may be configured to control presentation of the detected planar surfaces on the display screen 218A. The display screen 218A may correspond to the display of the electronic device 102. The I/O device 218 may comprise various input and output devices that may be configured to communicate with the processor 202. Examples of the input devices or input mechanisms may include, but are not limited to, a shutter button, a record button on the electronic device 102 (such as a camera), a software button on a UI of the electronic device 102, the imaging device 204, a touch screen, a microphone, a motion sensor, and/or a light sensor. Examples of the output devices may include, but are not limited to, the display screen 218A, a projector screen, and/or a speaker. The display screen 218A may be realized through several known technologies, such as, but not limited to, Liquid Crystal Display (LCD) display, Light Emitting Diode (LED) display, and/or Organic LED (OLED) display technology.

The transceiver 220 may comprise suitable logic, circuitry, interfaces, and/or code that may be configured to communicate with one or more cloud resources, such as the server 104 (as shown in FIG. 1), via the communication network 106 (as shown in FIG. 1). The transceiver 220 may implement known technologies to support wired or wireless communication of the electronic device 102 with the communication network 106. Components of the transceiver 220 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the imaging device 204 of the electronic device 102 may be configured to capture a scene, for example, an indoor scene, referred to as the captured scene 108. The captured scene 108 may comprise a plurality of scene points. The one or more sensors 208 may be configured to provide depth information associated with the plurality of scene points in the captured scene 108 to the coordinate determination circuitry 210. The coordinate determination circuitry 210 may be configured to utilize the received depth information for determination of the 3D coordinates that corresponds to the plurality of scene points of the captured scene 108. The relationship between the depth information and the 3D coordinates to be determined by, for example, the following mathematical expressions (1) and (2):

$$X = \frac{x}{w} * (-Z) * 2\tan\left(\frac{\alpha}{2}\right) \quad (1)$$

$$Y = \frac{y}{h} * (-Z) * 2\tan\left(\frac{\beta}{2}\right) \quad (2)$$

where,
X, Y corresponds to the 3D coordinates corresponding to a scene point;
x, y corresponds to the index of the scene point in the image domain of the captured scene 108;
w, h corresponds to the scene width and height in pixels of the captured scene 108;
α, β corresponds to the horizontal and vertical field-of-view of the imaging device 204; and Z corresponds to the depth information of the scene point.

The vector computation circuitry 212 in conjunction with the processor 202 may be configured to receive the determined 3D coordinates of the plurality of scene points of the captured scene 108. The vector computation circuitry 212 may be further configured to determine a pair of orthogonal vectors based on the determined 3D coordinates of two neighboring scene points from the plurality of scene points. In accordance with an embodiment, the determined pair of orthogonal vectors may include a horizontal tangent vector and a vertical tangent vector. For each scene point, vertical and horizontal tangent vectors $\vec{v}$, $\vec{h}$ may be defined using the 3D coordinates of its four neighboring points (a, b, c, d). For example, considering an exemplary single scene point of the plurality of scene points, the pair of orthogonal vectors, such as the horizontal tangent vector and the vertical tangent vector, for the exemplary scene point may be determined by the following expressions (3) and (4):

$$\vec{v} = b - a \qquad (3)$$

$$\vec{h} = d - c \qquad (4)$$

where, $\vec{v}$, $\vec{h}$ correspond to the vertical tangent vector and the horizontal tangent vector respectively, associated with the exemplary scene point; and a, b, c, and d correspond to 3D coordinates of the four neighboring scene points associated with the exemplary scene point.

In accordance with an embodiment, the depth information obtained from the one or more sensors 208 may not be accurate and may correspond an internal noise associated with the one or more sensors 208. In order to exclude such internal noise associated with the one or more sensors 208, averaging of the horizontal tangent vector $\vec{h}$, and the vertical tangent vector $\vec{v}$, may be performed for accurate determination of the pair of orthogonal vectors associated with the plurality of scene points. Such an averaging of the horizontal tangent vector $\vec{h}$, and the vertical tangent vector $\vec{v}$, may correspond to a rectification process to obtain a valid pair of orthogonal vectors that may be further used for computation of a plurality of vectors, such as surface normal, for the plurality of scene points. In accordance with an embodiment, an average vertical tangent vector and an average horizontal tangent vector for the exemplary scene point may be computed by the following expressions (5) and (6):

$$\vec{v} = \frac{1}{9}\sum_{i=1}^{9} \vec{v}_i \qquad (5)$$

$$\vec{h} = \frac{1}{9}\sum_{i=1}^{9} \vec{h}_i \qquad (6)$$

where, $\vec{v}_i$, $\vec{h}_i$ correspond to the vertical and horizontal tangent vectors within the exemplary scene point's neighborhood.

The vector computation circuitry 212 may be further configured to utilize each of the determined pair of orthogonal vectors for computation of the plurality of vectors for the plurality of scene points. In accordance with an embodiment, each of the computed plurality of vectors may correspond to a surface normal that is computed for each scene point of the plurality of scene points for the captured scene. Alternatively stated, the surface normal $\vec{n}$ is computed as the cross product of the horizontal and vertical tangent vectors. For example, the computation of the surface normal for the exemplary scene point by use of the determined pair of orthogonal vectors (as given by the exemplary expressions (3), (4), (5), and (6)), may be done by the following expressions (7) and (8):

$$\vec{m} = \vec{h} * \vec{v} \qquad (7)$$

$$\vec{n} = \frac{\vec{m}}{|\vec{m}|} \qquad (8)$$

where, $\vec{v}$, $\vec{h}$ correspond to the vertical tangent vector and the horizontal tangent vector associated with the exemplary scene point;

$\vec{m}$ corresponds to the cross product of the horizontal tangent vector and the vertical tangent vector; and $\vec{n}$ corresponds to the surface normal of the corresponding exemplary scene point.

The clustering circuitry 214 in conjunction with the processor 202 may be configured to receive the computed plurality of vectors for the plurality of scene points from the vector computation circuitry 212. The clustering circuitry 214 may be further configured to cluster the computed plurality of vectors into a first set of clusters associated with the captured scene 108 based on orientation information associated with each of the computed plurality of vectors. For example, K-means clustering may be used for clustering the computed plurality of vectors into the first set of clusters.

In accordance with an embodiment, the clustering of the computed plurality of vectors into the first set of clusters is executed in an orientation space. The first set of clusters may correspond to one or more planar surfaces parallel to one or more visible surfaces in the captured scene 108. For example, the surface normal (i.e. the computed plurality of vectors) of a table top surface that is parallel to a floor surface in the captured scene 108 may have the same orientation, and thus may be clustered in a first orientation cluster. Similarly, the surface normal (i.e. the computed plurality of vectors) of a white board surface placed in parallel to a wall surface in the captured scene 108 may have the same orientation, and thus may be clustered in a second orientation cluster. Similarly, the surface normal (i.e. the computed plurality of vectors) of other wall surfaces and the ceiling (of an indoor scene) in the captured scene 108 may exhibit respective orientations, and thus may be clustered in other orientation clusters of the first set of clusters. The clustering circuitry 214 may be further configured to plot the plurality of vectors computed by the vector computation circuitry 212 on a unit sphere to analyze a distribution of the computed plurality of vectors in the first set of clusters. Once the first set of clusters in the orientation space are available, the clustering circuitry 214 may be configured to determine, for each cluster of the first set of clusters, a second set of clusters, based on distance information associated with the computed plurality of vectors. The determination of the second set of clusters may be performed in a distance space. For example, although the surface normal of the table top surface and the floor surface in the captured scene 108 may have the same or similar orientation, the distance between the two surfaces exists, which may be explored. In accordance with an embodiment, the second set of clusters may be determined based on kernel density estimation (KDE). In accordance with an embodiment, the determination of each cluster in the second set of clusters may be based on a specified threshold value. The specified threshold value may correspond to a minimum number of scene points required to form a cluster in the second set of clusters. This may be done to ignore small planar surfaces which may have less than the required minimum number of scene points to form a cluster.

In accordance with an exemplary embodiment, for an exemplary vector of the computed plurality of vectors that corresponds to one planar surface, the computed plurality of vectors may further be separated by their distance from the origin of a camera coordinate system, for example, the coordinate system of the imaging device 204. For example, a vector computed for a scene point of the table top surface may be further separated from a vector computed for a scene point of the floor surface in the captured scene 108 by their distance using the camera coordinate system. The distance may be computed based on inner (dot) product of the scene point location vector and the unit surface normal vector at the scene point. The computed distance may be represented by, for example, the following expression (9):

$$d = |\vec{a} \cdot \vec{n}| \quad (9)$$

where, $\vec{a}$ corresponds to the scene point location vector; and $\vec{n}$ corresponds to the surface normal at the scene point.

The computed distances of the plurality of scene points may be clustered based on KDE. The local minimum of the KDE may be used for segmentation of the clusters in the second set of clusters. The surface detector 216 in conjunction with the processor 202 may be configured to receive the determined second set of clusters from the clustering circuitry 214. The surface detector 216 may be further configured to detect a plurality of planar surfaces separately in the captured scene 108 based on the determined second set of clusters. In accordance with an embodiment, the surface detector 216 in conjunction with the processor 202 may be further configured to determine an overall 3D structure of the captured scene 108 using each of the detected plurality of planar surfaces in the captured scene 108.

In accordance with an embodiment, the display screen 218A included in the I/O device 218, in conjunction with the surface detector 216 and the processor 202 may be configured to display the detected plurality of planar surfaces on the display screen 218A. In accordance with an embodiment, the memory 206 in conjunction with the processor 202 may be configured to store the detected planar surfaces. In accordance with an embodiment, the transceiver 220 may be configured to transmit the detected planar surfaces to one or more cloud resources, such as the server 104 (FIG. 1), via the communication network 106 (FIG. 1).

Figure 3A:
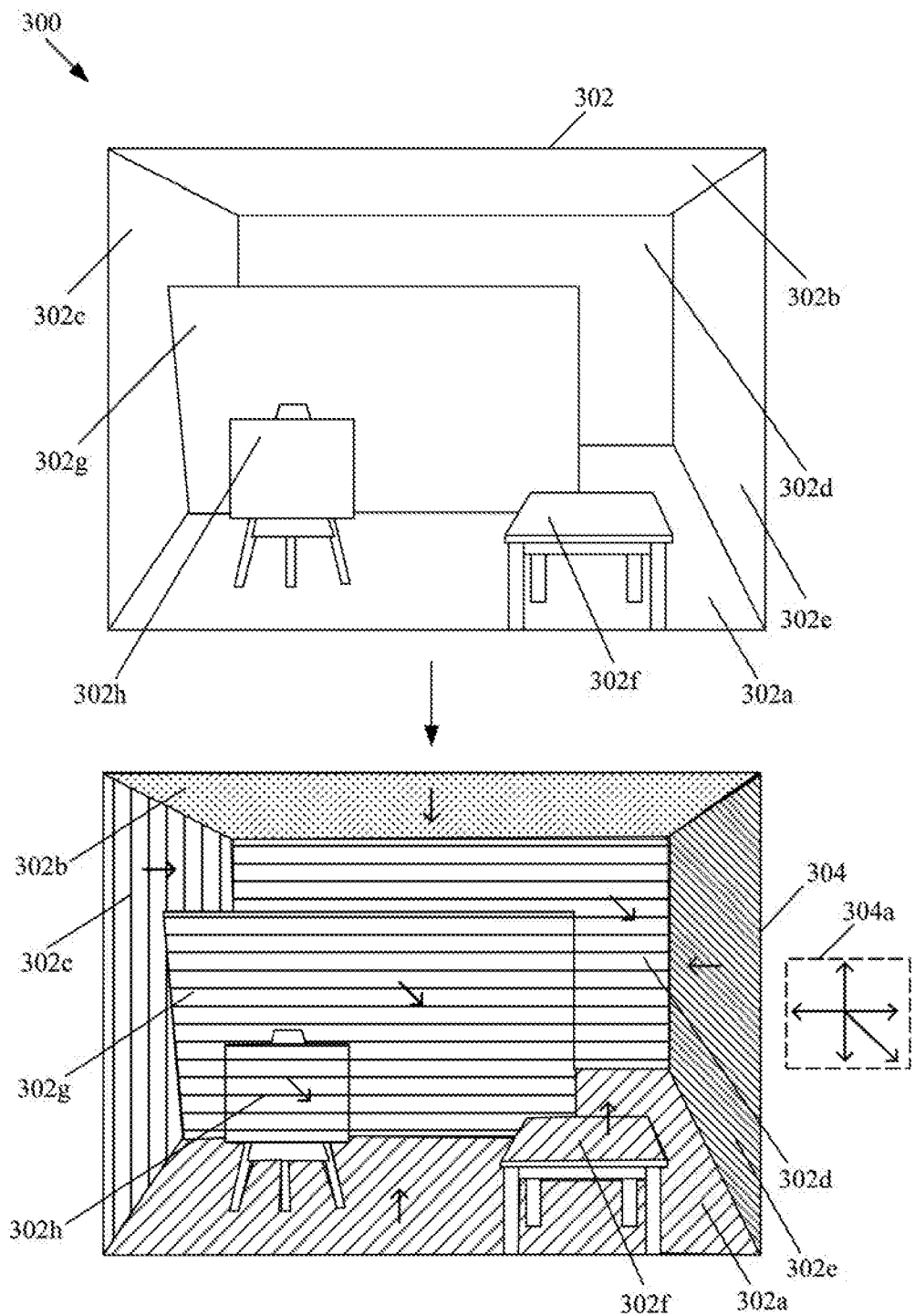
FIGS. 3A and 3B, collectively, illustrates an exemplary scenario for detection of planar surfaces in an image-processing system, in accordance with an embodiment of the disclosure.
Figure 3B:
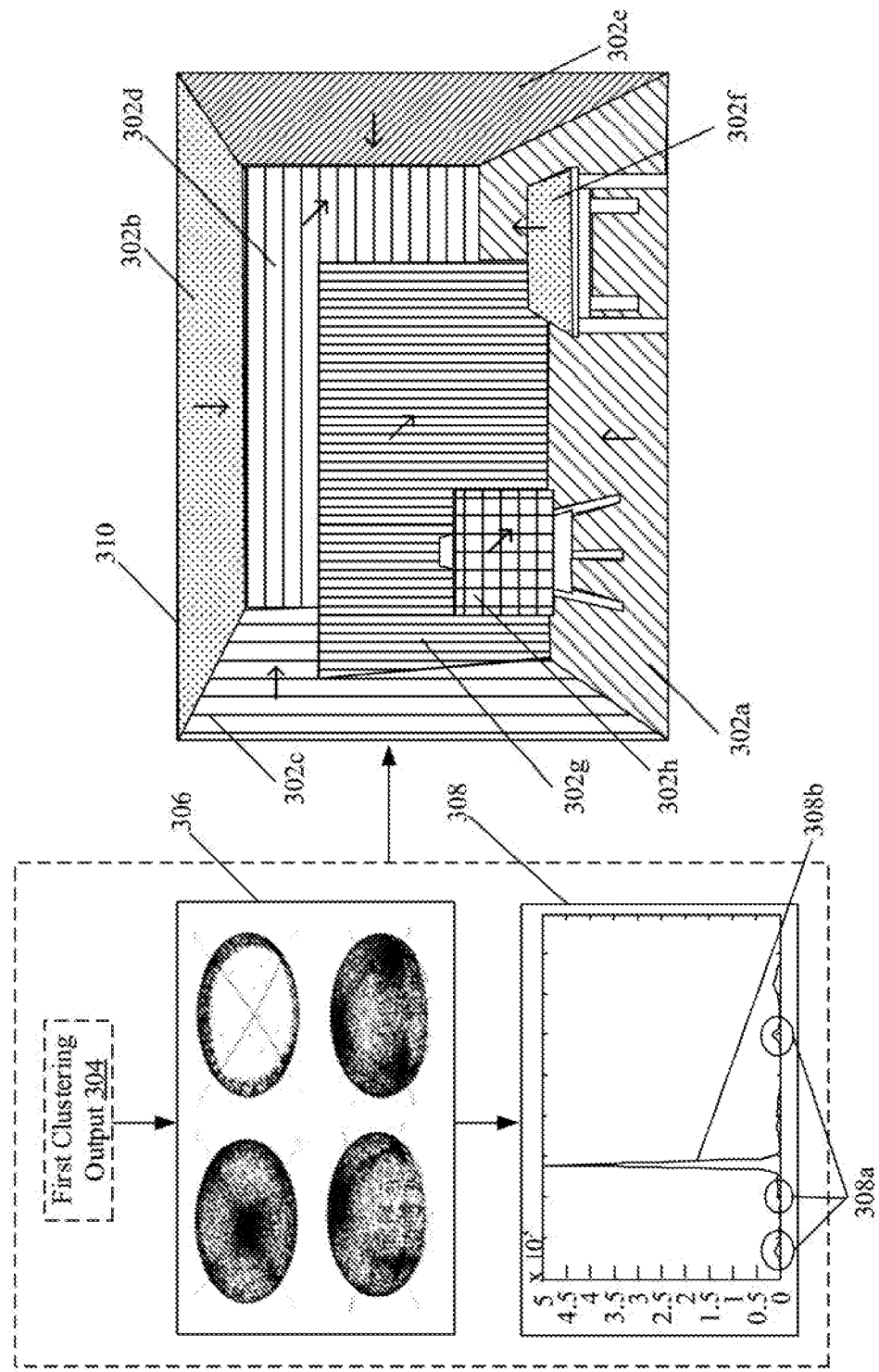

FIGS. 3A and 3B, collectively, illustrates an exemplary scenario for detection of planar surfaces in an image-processing system, in accordance with an embodiment of the disclosure. With reference to FIG. 3A, there is shown an exemplary scenario 300 that includes a captured scene 302 that includes various planar surfaces, such as a floor surface 302a, a ceiling surface 302b, surface of walls 302c to 302e, a table top surface 302f, a vertical partition 302g, and a vertically placed board 302h. There is also shown a first clustering output 304 and a representation 304a to depict different orientations in a space and in the first clustering output 304. The exemplary scenario 300 is described in conjunction with elements from FIGS. 1 and 2.

With reference to the exemplary scenario 300, the captured scene 302 may be an indoor scene captured by the imaging device 204. The captured scene 302 comprises a plurality of scene points. The captured scene 302 may correspond to the captured scene 108 (as described in FIG. 1). The one or more sensors 208 may be configured to provide depth information associated with the plurality of scene points in the captured scene 302, to the coordinate determination circuitry 210. The coordinate determination circuitry 210 may be configured to utilize the received depth information for determination of 3D coordinates corresponding to the plurality of scene points of the captured scene 302. The 3D coordinates may be determined based on the expressions (1) and (2), as described in FIG. 2. Based on the 3D coordinates determined by the coordinate determination circuitry 210, the vector computation circuitry 212 may be configured to determine a pair of orthogonal vectors based on the determined 3D coordinates of two neighboring scene points from the plurality of scene points. In accordance with an embodiment, the determined pair of orthogonal vectors may include a horizontal tangent vector and a vertical tangent vector. The pair of orthogonal vectors, such as the horizontal tangent vector and the vertical tangent vector, for the plurality of scene points in the captured scene 302 may be determined based on the mathematical expressions (3) and (4). Further, averaging of the determined pair of orthogonal vectors may be executed based on the mathematical expressions (5) and (6).

The vector computation circuitry 212 may be further configured to utilize each of the determined pair of orthogonal vectors for computation of a plurality of vectors for the plurality of scene points in the captured scene 302. In accordance with the exemplary scenario, each of the computed plurality of vectors may correspond to a surface normal that is computed for each scene point of the plurality of scene points for the captured scene 302. The computation of the surface normal for the plurality of scene points in the captured scene 302 may be done based on the mathematical expressions (7) and (8), described in FIG. 2.

The clustering circuitry 214 may be further configured to cluster the computed plurality of vectors into a first set of clusters associated with the captured scene 302 based on orientation information associated with each of the computed plurality of vectors. In accordance with an embodiment, K-means clustering may be used for clustering the computed plurality of vectors into the first set of clusters. The clustering of the computed plurality of vectors into the first set of clusters is performed in an orientation space. The first set of clusters may correspond to one or more planar surfaces parallel to one or more visible surfaces in orientation in the captured scene 302. For example, consider the captured scene 302 of the indoor scene as a room or as a cubical structure with six sides that have six surface orientations, the floor surface 302a, the ceiling surface 302b, and the four walls. Out of the four walls, surfaces of three walls 302c to 302e, are visible in the captured scene 302 as the remaining wall surface may lie behind the imaging device 204 during capture of the image, such as the captured scene 302. As there cannot be surface normal at or near camera's viewing direction, such as viewing direction from the imaging device 204 at the time of capture of the captured scene 302, five major orientation clusters may be obtained for the 5 sides, as the first set of clusters. For example, the computed plurality of vectors for the floor surface 302a and the table top surface 302f may have the same orientation (a bottom to top orientation) and thus may be clustered as a first orientation cluster.

Similarly, the computed plurality of vectors for the surface of the left wall 302c may have the same orientation (left to right orientation as shown by the arrow mark from the surface of the left wall 302c) and thus may be clustered as a second orientation cluster. The computed plurality of vectors for the surface of the right wall 302e may have the same orientation (right to right orientation) and thus may be clustered as a third orientation cluster. The computed plurality of vectors for the vertical surfaces that lie parallel to each other, such as the vertical partition 302g, the vertically placed board 302h, and the surface of the front wall 302d may have the same orientation (rear to front orientation facing the imaging device 204) and thus may be clustered as a fourth orientation cluster. The computed plurality of vectors for the ceiling surface 302b that have the same orientation (top to bottom orientation of vectors) may be clustered as a fifth orientation cluster. All these 5 orientation clusters may be collectively referred to the first set of clusters, where clustering is done in the orientation space (different orientation is shown by the representation 304a), and may be mapped to an image domain of the captured scene 302, as shown in the first clustering output 304.

With reference to FIG. 3B, there is shown the first clustering output 304, a unit sphere distribution 306, a density estimation graph 308, and a second clustering output 310. The clustering circuitry 214 may be further configured to plot the plurality of vectors computed by the vector computation circuitry 212 on a unit sphere to analyze a distribution of the computed plurality of vectors (e.g. the surface normals) that exhibits (or to observe) the 5 major orientation clusters of the first set of clusters, as shown in the unit sphere distribution 306, for example. The orientation-based clustering (as described in FIG. 3A) may be followed by a distance based clustering of each orientation cluster of the first set of clusters. The clustering circuitry 214 may be configured to determine, for each cluster of the first set of clusters, a second set of clusters, based on distance information associated with the computed plurality of vectors. The distance information may be computed based on the mathematical expression (9). The determination of the second set of clusters may be performed in a distance space. The second set of clusters may be determined based on KDE, as shown by the density estimation graph 308 in an example. As local minimum is utilized in the density estimation to segment the first set of clusters, therefore, the number of clusters need not to be specified in the KDE. Each of the five major orientation clusters may be further segregated into sub-clusters based on the distance information associated with the computed plurality of vectors. For example, the first orientation cluster that include the computed plurality of vectors for the floor surface 302a and the table top surface 302f in the same orientation, may be re-clustered separately based on distance between the computed plurality of vectors for the floor surface 302a and the table top surface 302f. Similarly, the fourth orientation cluster that include the computed plurality of vectors the vertical partition 302g, the vertically placed board 302h, and the surface of the front wall 302d, may be re-clustered based on the distance information associated with the computed plurality of vectors for the fourth orientation cluster. Likewise, for each cluster of the first set of clusters, the second set of clusters, may be obtained based on the distance information associated with the computed plurality of vectors. The determined second set of clusters may be mapped to the image domain of the captured scene 302, and may be represented, for example, by the second clustering output 310. In accordance with an embodiment, the determination of each cluster in the second set of clusters may be based on a specified threshold value. The specified threshold value may correspond to a minimum number of scene points required to form a cluster. For example, after distance clustering using KDE, small clusters whose number of points is below the specified threshold value may be merged with their closest large cluster. As shown in the density estimation graph 308, for example, clusters 308a whose number of points are below the specified threshold value may be merged with their closest large cluster, such as a cluster 308b.

The surface detector 216 in conjunction with the processor 202 may be configured to receive the determined second set of clusters from the clustering circuitry 214. The surface detector 216 may be further configured to detect the plurality of planar surfaces in the captured scene 302 based on the determined second set of clusters. For example, the five initial orientation clusters may be separated into more than 5 sub-clusters, for example, about 8-30 sub-clusters. The surface detector 216 in conjunction with the processor 202 may be further configured to determine an overall 3D structure of the captured scene 302 using the distinctly or separately detected plurality of planar surfaces in the captured scene 302. The display screen 218A included in the I/O device 218, in conjunction with the surface detector 216 and the processor 202 may be configured to display the determined 3D structure of the captured scene 302 with detected plurality of planar surfaces on the display screen 218A.

Figure 4:
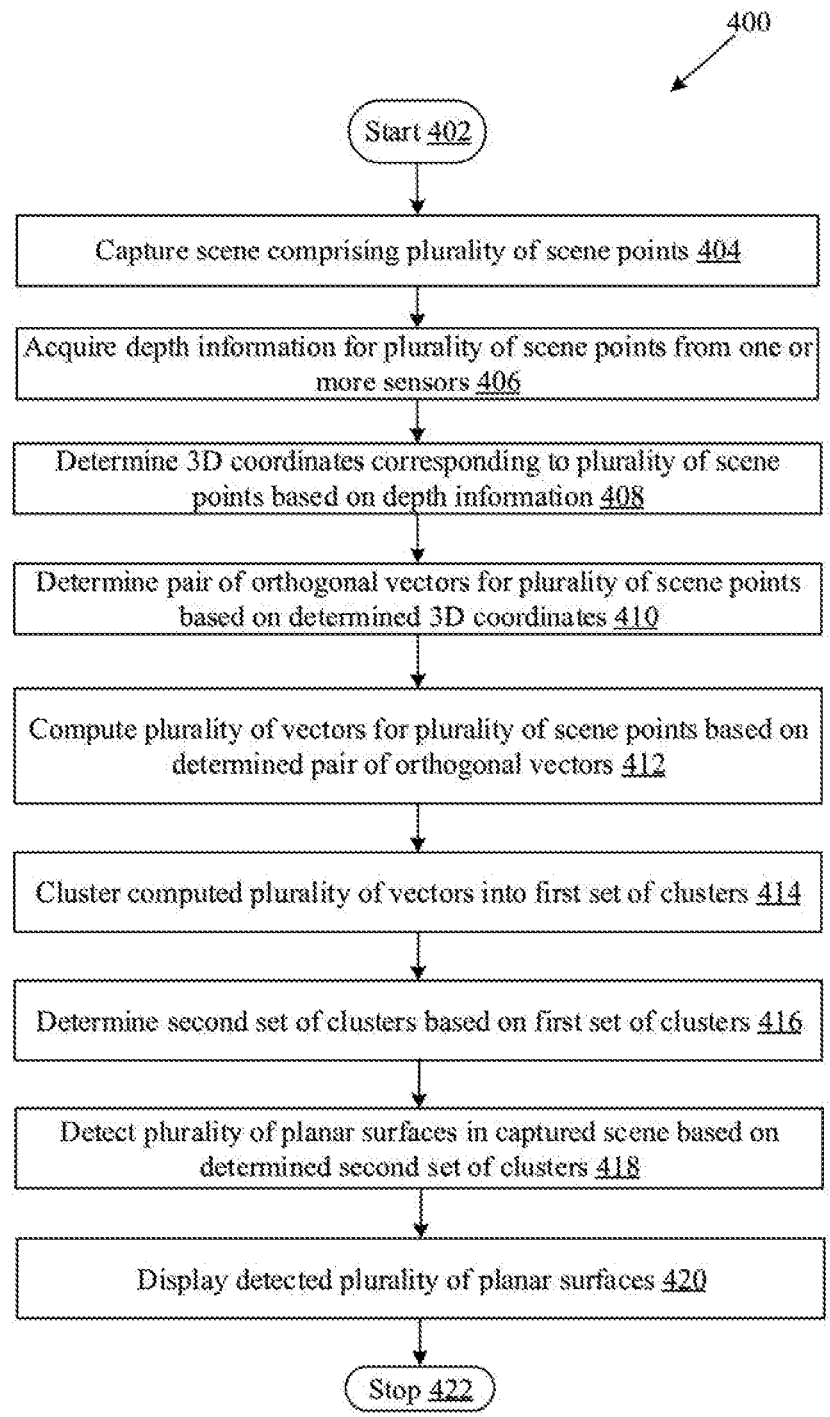
FIG. 4 depicts a flow chart that illustrates exemplary operations for detection of planar surfaces in the image-processing system of FIG. 2, in accordance with an embodiment of the disclosure.

FIG. 4 depicts a flow chart that illustrates exemplary operations for detection of planar surfaces in the image-processing system of FIG. 2, in accordance with an embodiment of the disclosure. With reference to FIG. 4, there is shown a flowchart 400. The flowchart 400 is described in conjunction with elements of FIGS. 1, 2, and 3. The method starts at 402 and proceeds to 404.

At 404, a scene comprising a plurality of scene points may be captured. The imaging device 204 included in the electronic device 102 may be configured to capture the scene. An example of the scene is the captured scene 108 (FIG. 1) and the captured scene 302 (FIG. 3A). The captured scene 108 may correspond to an indoor scene that may comprise the plurality of scene points. In accordance with an embodiment, an image that corresponds to the captured scene 108 may be retrieved from the memory 206 of the electronic device 102.

At 406, depth information for the plurality of scene points may be acquired from one or more sensors. The one or more sensors 208 may be configured to provide the depth information associated with the plurality of scene points in the captured scene 108. The depth information provided by the one or more sensors 208 may be communicated to the coordinate determination circuitry 210.

At 408, 3D coordinates corresponding to the plurality of scene points based on the depth information may be determined. The coordinate determination circuitry 210 may be further configured to utilize the depth information received from the one or more sensors 208 for determination of the 3D coordinates that corresponds to the plurality of scene points of the captured scene 108. The 3D coordinates for the plurality of scene points in the captured scene 108 may be determined by the mathematical expressions (1) and (2).

At 410, a pair of orthogonal vectors for the plurality of scene points may be determined based on the determined 3D coordinates. The vector computation circuitry 212 may be configured to receive the determined 3D coordinates of the plurality of scene points of the captured scene 108. The vector computation circuitry 212 may be further configured to determine the pair of orthogonal vectors for the plurality of scene points based on the determined 3D coordinates of two neighboring scene points from the plurality of scene points. The determined pair of orthogonal vectors may include a horizontal tangent vector and a vertical tangent vector. The pair of orthogonal vectors for the scene point may be determined based on the mathematical expressions (3) and (4). Further, the depth information obtained from the one or more sensors 208 may not be accurate and may correspond an internal noise associated with the one or more sensors 208. In order to exclude such internal noise associated with the one or more sensors 208, averaging of the horizontal tangent vector and the vertical tangent vector may be performed for accurate determination of the pair of orthogonal vectors associated with the plurality of scene points. Such an averaging of the horizontal tangent vector and the vertical tangent vector may correspond to a rectification process for obtaining a valid pair of orthogonal vectors that may be further used for computation of a plurality of vectors, such as surface normal, for the plurality of scene points. The average vertical tangent vector and the average horizontal tangent vector may be computed based on the mathematical expressions (5) and (6).

At 412, a plurality of vectors for the plurality of scene points may be computed based on the determined pair of orthogonal vectors. The vector computation circuitry 212 may be configured to utilize each of the determined pair of orthogonal vectors for computation of the plurality of vectors for the plurality of scene points, respectively. In accordance with an embodiment, each of the computed plurality of vectors may correspond to a surface normal that is computed for each scene point of the plurality of scene points for the captured scene. The plurality of vectors for the plurality of scene points may be computed based on the mathematical expressions (7) and (8).

At 414, the computed plurality of vectors may be clustered into a first set of clusters. The clustering circuitry 214 may be configured to receive the computed plurality of vectors for the plurality of scene points from the vector computation circuitry 212. The clustering circuitry 214 may be further configured to cluster the computed plurality of vectors into the first set of clusters associated with the captured scene based on orientation information associated with each of the computed plurality of vectors. In accordance with an embodiment, K-means clustering may be used for clustering the computed plurality of vectors into the first set of clusters. The clustering of the computed plurality of vectors into the first set of clusters is performed in the orientation space. The first set of clusters may correspond to one or more planar surfaces parallel to one or more visible surfaces in the captured scene 108. The clustering circuitry 214 may be further configured to plot the plurality of vectors computed by the vector computation circuitry 212 on a unit sphere to analyze a distribution of the computed plurality of vectors in the first set of clusters.

At 416, a second set of clusters based on the first set of clusters may be determined. The clustering circuitry 214 may be configured to determine, for each cluster of the first set of clusters, the second set of clusters, based on distance information associated with the computed plurality of vectors. The distance information may be computed based the mathematical expression (9). The determination of the second set of clusters may be performed in a distance space. The second set of clusters may be determined based on kernel density estimation (KDE). The determination of each cluster in the second set of clusters may be based on a specified threshold value. The specified threshold value may correspond to a minimum number of scene points required to forma a cluster in the second set of clusters.

At 418, a plurality of planar surfaces in the captured scene may be detected based on the determined second set of clusters. The surface detector 216 in conjunction with the processor 202 may be configured to receive the determined second set of clusters from the clustering circuitry 214. The surface detector 216 may be further configured to detect the plurality of planar surfaces in the captured scene 108 based on the determined second set of clusters. The surface detector 216 in conjunction with the processor 202 may be further configured to determine an overall 3D structure of the captured scene using the separately detected plurality of planar surfaces in the captured scene 108.

At 420, the detected plurality of planar surfaces may be displayed. In accordance with an embodiment, the processor 202 may be configured to display the detected plurality of planar surfaces on the display screen 218A. Control passes to end 422.

Various embodiments of the disclosure encompass numerous advantages that includes an image-processing method and system for detection of planar surfaces for scene modeling of a captured scene, such as the captured scene 108 (FIG. 1) or the captured scene 302 (FIG. 3A). The method for detection of planar surfaces overcome the issues of the traditional techniques for 3D modeling or mapping of 3D surfaces. For example, the method and system for detection of planar surfaces doesn't require certain preconditions, such as availability of landmark scene points, or the like, for detection of planar surfaces. Further, as the method provides a successive clustering method, for example, the orientation-based clustering followed by a distance based clustering of each orientation cluster of the first set of clusters, to infer the overall 3D structure of the scene, for example, the captured scene 108, the overall computational complexity of the image-processing system, such as the electronic device 102, is reduced. For example, as shown and described in the exemplary scenario 300, it may be observed that the various planar surfaces, such as the floor surface 302a, the ceiling surface 302b, surface of walls 302c to 302e, the table top surface 302f, the vertical partition 302g, and the vertically placed board 302h, are detected accurately in the second clustering output 310, according to the corresponding depth information obtained from the one or more sensors 208. Thus, in comparison to the techniques used in the past for 3D modeling of an indoor scene, the operations executed by the vector computation circuitry 212, the clustering circuitry 214, and the surface detector 216 provides significant efficiency and accuracy in detection of the plurality of planar surfaces distinctly and clearly in any captured scene.

In accordance with an embodiment of the disclosure, an image-processing system for use in scene modeling is disclosed. The electronic device 102 (FIG. 1) may comprise one or more circuits, such as the coordinate determination circuitry 210 (FIG. 2), that may be configured to determine three dimensional (3D) coordinates corresponding to a plurality of scene points of a scene captured by the one or more circuits, such as the imaging device 204 (FIG. 2), based on depth information associated with the plurality of scene points. The electronic device 102 may comprise one or more circuits, such as the vector computation circuitry 212 (FIG. 2), that may be configured to compute a plurality of vectors for the plurality of scene points respectively, based on the determined 3D coordinates. The electronic device 102 may further comprise one or more circuits, such as the clustering circuitry 214 (FIG. 2), that may be configured to cluster the computed plurality of vectors into a first set of clusters associated with the captured scene based on orientation information associated with each of the computed plurality of vectors. The electronic device 102 may further comprise one or more circuits, such as the clustering circuitry 214 (FIG. 2), that may be configured to determine, for each cluster of the determined first set of clusters, a second set of clusters, based on distance information associated with the computed plurality of vectors. The electronic device 102 may further comprise one or more circuits, such as the surface detector 216 (FIG. 2), that may be configured to detect a plurality of planar surfaces separately in the captured scene based on the determined second set of clusters.

Various embodiments of the disclosure may provide a non-transitory computer readable medium and/or storage medium, wherein there is stored thereon, a machine code and/or a computer program with at least one code section executable by a machine and/or a computer for detection of planar surfaces for use in scene modeling. The at least one code section in the electronic device 102 may cause the machine and/or computer to perform the steps that comprise determination of three dimensional (3D) coordinates corresponding to a plurality of scene points of a scene captured by the one or more circuits, based on depth information associated with the plurality of scene points The electronic device 102 may be further configured to compute a plurality of vectors for the plurality of scene points respectively, based on said determined 3D coordinates. The electronic device 102 may be further configured to cluster the computed plurality of vectors into a first set of clusters associated with the captured scene based on orientation information associated with each of the computed plurality of vectors. The electronic device 102 may be further configured to determine, for each cluster of the determined first set of clusters, a second set of clusters, based on distance information associated with the computed plurality of vectors. Further, the electronic device 102 may be configured to detect a plurality of planar surfaces separately in the captured scene based on the determined second set of clusters.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. An image-processing method, comprising:
   in an electronic device comprising at least one circuit and an image-capture device;
      capturing a scene by said image-capture device;
      determining, by said at least one circuit, three dimensional (3D) coordinates corresponding to a plurality of scene points of said captured scene, wherein said 3D coordinates are determined based on depth information associated with said plurality of scene points;
      computing, by said at least one circuit, a plurality of vectors for said plurality of scene points based on said 3D coordinates;
      clustering, by said at least one circuit, said computed plurality of vectors into a first set of clusters associated with said captured scene, wherein said clustering is based on orientation information associated with each of said computed plurality of vectors;
      determining, by said at least one circuit, a second set of clusters for each cluster of said first set of clusters based on distance information associated with said computed plurality of vectors;
      determining, by said at least one circuit, that a number of scene points of a first cluster of said second set of clusters is less than a minimum number of scene points required to form each cluster of said second set of clusters;
      merging, by said at least one circuit, said first cluster with a second cluster of said second set of clusters to obtain a third set of clusters, wherein said merging is based on said determination that said number of scene points of said first cluster is less than said minimum number of scene points; and
      detecting, by said at least one circuit, a plurality of planar surfaces in said captured scene based on said third set of clusters.

2. The image-processing method according to claim 1, wherein said captured scene corresponds to an indoor scene comprising said plurality of scene points.

3. The image-processing method according to claim 1, wherein said depth information associated with said plurality of scene points is obtained by at least one sensor.

4. The image-processing method according to claim 1, wherein each of said computed plurality of vectors corresponds to a surface normal that is computed for each scene point of said plurality of scene points.

5. The image-processing method according to claim 1, wherein
   said computed plurality of vectors is clustered into said first set of clusters in an orientation space, and
   said second set of clusters is determined in a distance space.

6. The image-processing method according to claim 1, further comprising determining a pair of orthogonal vectors based on said determined 3D coordinates of two neighboring scene points from said plurality of scene points.

7. The image-processing method according to claim 6, further comprising utilizing each of said pair of orthogonal vectors for said computation of said plurality of vectors.

8. The image-processing method according to claim 6, wherein said pair of orthogonal vectors includes a horizontal tangent vector and a vertical tangent vector.

9. The image-processing method according to claim 1, further comprising plotting said computed plurality of vectors on a unit sphere for distribution analysis of said computed plurality of vectors in said first set of clusters.

10. The image-processing method according to claim 1, wherein said first set of clusters corresponds to at least one planar surface parallel to at least one visible surface in said captured scene.

11. The image-processing method according to claim 1, further comprising:
   detecting said plurality of planar surfaces separately in said captured scene; and
   determining an overall 3D structure of said captured scene based on said plurality of planar surfaces detected separately in said captured scene.

12. The image-processing method according to claim 1, wherein said first cluster is closest to said second cluster among said second set of clusters.

13. An image-processing system, comprising:
   an image-capture device configured to capture a scene; and
   at least one circuit in an electronic device configured to:
      determine three dimensional (3D) coordinates corresponding to a plurality of scene points of said captured scene, based on depth information associated with said plurality of scene points;
      compute a plurality of vectors for said plurality of scene points based on said 3D coordinates;
      cluster said computed plurality of vectors into a first set of clusters associated with said captured scene, based on orientation information associated with each of said computed plurality of vectors;
      determine a second set of clusters for each cluster of said first set of clusters based on distance information associated with said computed plurality of vectors;
      determine that a number of scene points of a first cluster of said second set of clusters is less than a minimum number of scene points required to form each cluster of said second set of clusters;
      merge said first cluster with a second cluster of said second set of clusters to obtain a third set of clusters, wherein said merge is based on said determination that said number of scene points of said first cluster is less than said minimum number of scene points; and
      detect a plurality of planar surfaces in said captured scene based on said third set of clusters.

14. The image-processing system according to claim 13, wherein said captured scene corresponds to an indoor scene comprising said plurality of scene points.

15. The image-processing system according to claim 13, wherein said depth information associated with said plurality of scene points is obtained by at least one sensor.

16. The image-processing system according to claim 13, wherein each of said computed plurality of vectors corresponds to a surface normal that is computed for each scene point of said plurality of scene points.

17. The image-processing system according to claim 13, wherein
   said computed plurality of vectors is clustered into said first set of clusters in an orientation space, and
   said second set of clusters is determined in a distance space.

18. The image-processing system according to claim 13, wherein said at least one circuit is further configured to plot said computed plurality of vectors on a unit sphere for distribution analysis of said computed plurality of vectors in said first set of clusters.

19. The image-processing system according to claim 13, wherein said first set of clusters corresponds to at least one planar surface parallel to at least one visible surface in said captured scene.

20. The image-processing system according to claim 13, wherein said at least one circuit is further configured to:
   detect said plurality of planar surfaces separately in said captured scene; and
   determine an overall 3D structure of said captured scene based on said plurality of planar surfaces detected separately in said captured scene.

* * * * *